(12) United States Patent
Deutschel et al.

(10) Patent No.: US 6,193,006 B1
(45) Date of Patent: Feb. 27, 2001

(54) DYNAMIC ALL WHEEL DRIVE CONTROL

(75) Inventors: Brian William Deutschel, Sterling Heights; Donald Graham Straitiff, Howell, both of MI (US)

(73) Assignee: General Motors Corporation, Detroit, MI (US)

( * ) Notice: Under 35 U.S.C. 154(b), the term of this patent shall be extended for 0 days.

(21) Appl. No.: 09/385,553

(22) Filed: Aug. 30, 1999

(51) Int. Cl.$^7$ ............................................. B60K 17/354
(52) U.S. Cl. ............................................. 180/245; 180/298
(58) Field of Search .................................. 180/245, 248, 180/249, 250, 197

(56) References Cited

U.S. PATENT DOCUMENTS

| | | | |
|---|---|---|---|
| 4,676,336 | * | 6/1987 | Hiramatsu et al. ................ 180/233 |
| 5,005,662 | * | 4/1991 | Kodama ............................... 180/223 |
| 5,056,640 | * | 10/1991 | Yamamoto ........................ 192/85 AA |
| 5,080,187 | * | 1/1992 | Asano et al. ........................ 180/248 |
| 5,219,038 | * | 6/1993 | Hamada et al. .................... 180/248 |
| 5,927,426 | * | 7/1999 | Hall et al. ........................... 180/249 |
| 6,009,968 | * | 1/2000 | Kouno ................................. 180/248 |
| 6,045,476 | * | 4/2000 | Haka .................................... 475/198 |

* cited by examiner

Primary Examiner—Kevin Hurley
Assistant Examiner—Andrew J. Fischer
(74) Attorney, Agent, or Firm—Charles E. Leahy

(57) ABSTRACT

A selective all wheel drive powertrain has an engine and transaxle adapted to normally drive the front wheels of a vehicle. A transfer gear set, drive shaft, clutch and differential are connectable between the output of transaxle and the rear wheels of the vehicle to selectively provide an all wheel drive system. A pump, which supplies the fluid pressure to engage the clutch, has a pair of relatively rotatable members that are connected to rotate in unison with opposite sides of the clutch such that when the valve is operated, the clutch will be engaged. A selectively operable valve is disposed between a reservoir and the pump and controlled in actuation by the vehicle traction control system (TCS) to connect the pump to the reservoir when a loss of traction is sensed by the TCS. The clutch is effectively controlled by the selectively operable valve that supplies the fluid to the pump. The clutch is disposed in the drive path between the drive shaft and the differential with one set of clutch plates being connected to rotate with the drive shaft and another set of clutch plates being connected to rotate with the input to the differential. The pump has one member rotatable with the drive shaft side of the clutch and another member rotatable with the differential side of the clutch.

2 Claims, 2 Drawing Sheets

DYNAMIC ALL WHEEL DRIVE CONTROL

TECHNICAL FIELD

This invention relates to all wheel drive powertrains and more particularly to such drives having a control element to disconnect the all wheel drive from one pair of driving wheels.

BACKGROUND OF THE INVENTION

Many modern vehicles employ four wheel drive systems. These systems have been marketed in two forms. Systems generally termed four wheel drive (4WD) have a transfer case which is controlled by the operator to select two wheel or four wheel drive. If the operator selects the four wheel drive condition, the vehicle drives all four wheel continuously. Some of these systems have employed overrunning clutches at two of the wheel to alleviate some of the disadvantages of 4WD which result from tire pressure differential and cornering to name a few.

All wheel drive (AWD) systems also provide the benefits of a four wheel drive vehicle and do not require the operator to intentionally select this condition. These systems often employ a viscous clutch in the center differential to transfer torque to the drive wheels that are not sensed as slipping. In tight cornering situations and during towing, these AWD systems present a disadvantage. The vehicle must be placed on a flat-bed type towing vehicle to prevent overheating of the powertrain during towing. In cornering situations, noise and vibration can result from the AWD system being engaged. While this is not detrimental to the powertrain during short durations, it can be disconcerting to the operator.

One solution to this problem is can be found in U.S. Ser. No. 09/247,116 filed Feb. 9, 1999 and assigned to the assignee of this application. This previous application provides two positive displacement pumps each of which selectively pressurizes a respective clutch to establish a positive drive connection to each normally non-driven axle.

SUMMARY OF THE INVENTION

It is an object of the present invention to provide an improved all wheel drive powertrain having a single control pump and a single clutch.

In one aspect of the present invention, a powertrain has a pair of normally driven wheels and a pair of normally non-driven wheels and a selectively engageable clutch for connecting a differential of the normally non-driven wheels with the prime mover. In another aspect of the present invention, a drive shaft is positioned to transmit power from a multi-speed transmission through a selectively engageable clutch with the differential of the normally non-driven wheels.

In another aspect of the present invention, a positive displacement pump is disposed between the drive shaft and the input to the differential to supply fluid to the clutch when a speed differential is present between the drive shaft and the input to the differential. In yet another aspect of the present invention, a valve selectively operable valve member is in fluid communication between a fluid reservoir and the inlet to the pump to limit pump operation. In a further aspect of the present invention, the selectively operable valve member permits fluid communication between a reservoir and the pump inlet only when a traction loss is identified at the normally driven wheels.

In one embodiment of the present invention, a powertrain has a multi-speed transmission that is connected to drive the front wheels of a vehicle. A transfer gear set is positioned to supply power to a drive shaft that is connected, through a selectively engageable clutch and a differential gearing, with the rear wheels of the vehicle. A positive displacement pump is located between the drive shaft and the input to the differential gearing. One member of the pump is driven by the drive shaft and the other member is driven by the differential gearing input. When a speed differential is present between the pump members and fluid is supplied to the pump inlet, the outlet fluid of the pump will enforce engagement of a friction clutch which is selectively connectable between the drive shaft and the differential gearing input. The pump inlet is supplied with fluid only when a speed differential representing a loss of traction is sensed at the normally driven front wheels. When the clutch is engaged, the rear wheels will receive power from the engine of the vehicle through the transmission to establish an all wheel drive powertrain.

DESCRIPTION OF AN EXEMPLARY EMBODIMENT

Figure 1:
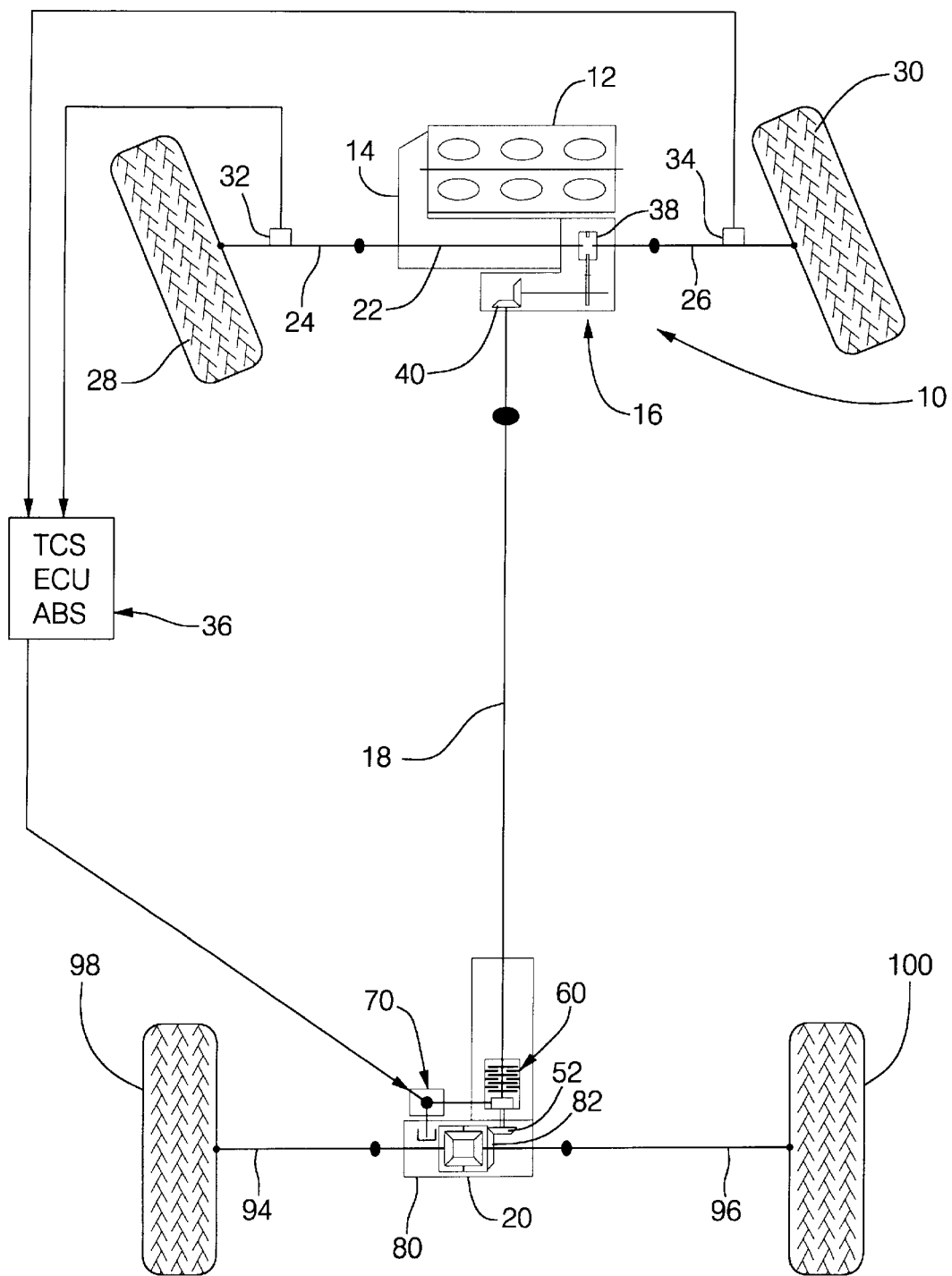
FIG. 1 is a diagrammatic representation of a powertrain incorporating the present invention.

A powertrain 10, shown in FIG. 1, includes an engine 12, a transaxle front drive transmission 14, transfer gearing 16, a drive shaft 18 and a rear drive differential 20. The engine 12 and transmission 14 are conventional powertrain members. The transmission 14 is preferably a four or five speed planetary transmission having an output shaft 22 that is connected with two drive axles 24 and 26 which, in turn, are drivingly connected with respective normally driven, front wheels 28 and 30 of a vehicle. The wheels 28 and 30 are the normally driven wheels of the vehicle. That is whenever the transmission 14 is conditioned to distribute power from the engine 12, the wheels will have a driving torque applied thereto.

Each axle 24 and 26 and wheel 26 and 30 combination has a respective speed sensor 32, 34 associated therewith. The speed sensors 32 and 34 issue control signals to a conventional electronic control unit (ECU) 36 which includes a preprogrammed digital computer, a traction control system (TCS) and an anti-lock brake system (ABS). The traction control system, as is well-known, issues commands when the drive wheels, i.e. wheels 28 and 30, lose traction and are slipping. The TCS is able to differentiate between wheel slippage and cornering maneuvers. Thus, while a speed differential is present at the front wheels 28 and 30 during cornering, the TCS will ignore this situation and no correcting signal will be issued.

Figure 2:
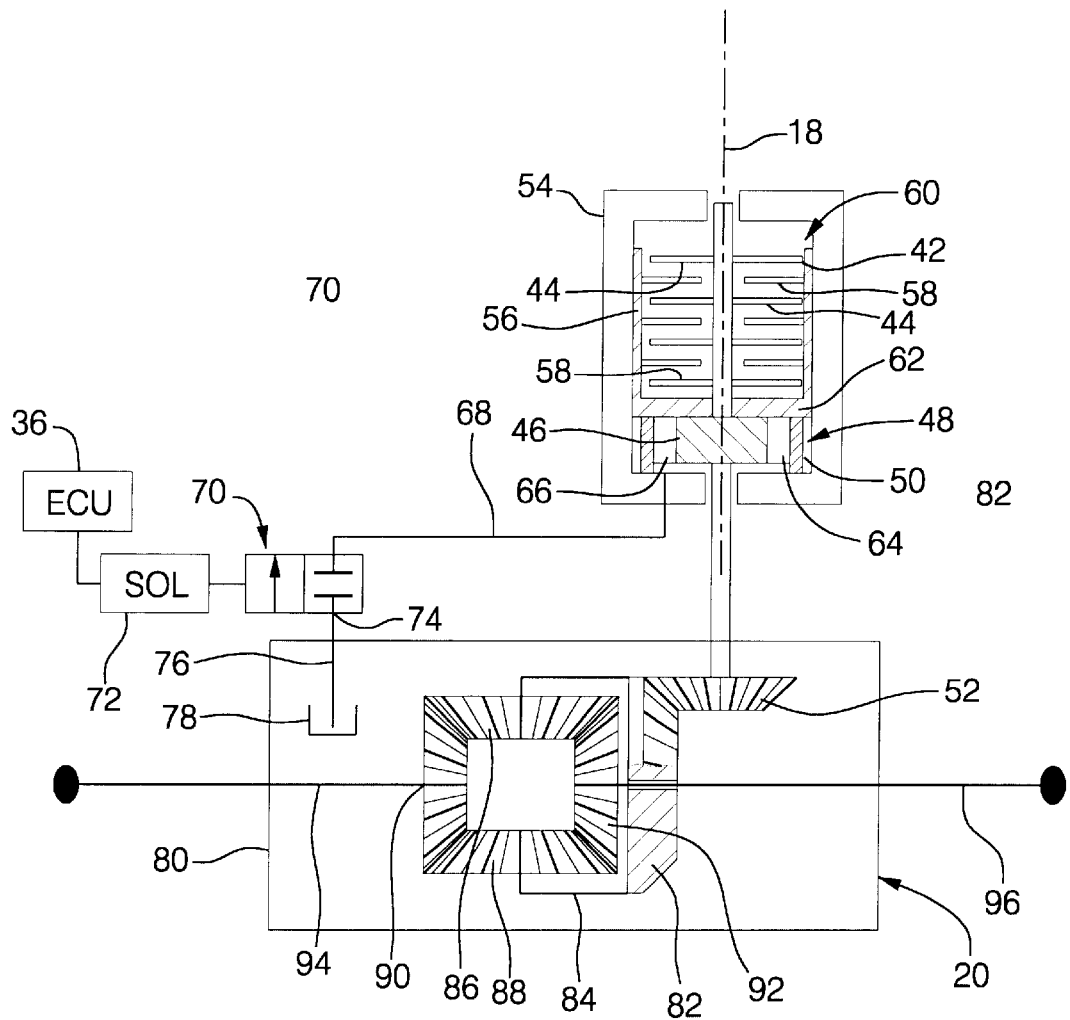
FIG. 2 is an enlargement of a portion of the diagrammatic representation shown in FIG. 1.

The transfer gearing 16 is driven from a differential gearing 38 and includes an output bevel gear 40 that is drivingly connected with the drive shaft 18. As best seen in FIG. 2, the drive shaft 18 has a splined portion 42 on which is drivingly connected a plurality of friction clutch plates 44. The drive shaft 18 is also drivingly connected with one member 46 of a positive displacement pump 48. The pump 48 is preferably an internal-external gear pump and specifically of the gerotor type. Another member 50 of the pump 48 is drivingly connected with an input pinion gear 52 which is a component of the differential 20.

The input pinion gear 52 is also drivingly connected with a casing 54 which surrounds the spline portion 42 of the drive shaft 18. The casing 54 has an internal splined portion 56 that drivingly engages a plurality of friction clutch plates 58 that are alternately spaces with respective clutch plates 44. The clutch plates 44 and 58 form a conventional clutch pack 60. A clutch apply piston 62 is slidably disposed in the casing 54 axially adjacent one of the clutch plates 58. The pump 48 has an outlet port 64 adapted to deliver hydraulic fluid to the piston 62 to enforce frictional engagement of the clutch plates 44 and 58.

The pump 48 has an inlet port 66 that is in fluid communication through a passage 68 with a conventional solenoid operated directional valve 70 having a solenoid control member 72 that is electrically connected with the ECU 36. The solenoid control member 72 receives command signals issued by the TCS to cause the valve 70 to move from the closed position shown to an open position. In the closed position of the valve 70, the pump 48 does not receive fluid to actuate the piston 62 and thereby engage the clutch pack 60.

The valve 70 has an inlet port 74 that is in fluid communication through a passage 76 with a reservoir 78 disposed in a casing 80 of the differential 20. When the TCS senses slippage at the front wheel 28 or 30 due to loss of traction, the ECU issues a signal to the solenoid 72 such that the valve 70 is actuated to an open position thereby connecting the pump inlet to the reservoir 78 such that hydraulic fluid will be distributed to the apply piston 62 which will engage the clutch pack 60 to thereby distribute power form the drive shaft 18 to the gear 52.

The differential 20 includes the pinion gear 52 which is disposed in meshing relation with a ring gear 82. The ring gear 82 is secured to a spider or cage 84 in which is rotatable mounted a pair of bevel gears 86, 88 that mesh with a pair of side gears 90, 92 that are rotatably mounted in the casing 80 and drivingly connected with respective drive axles 94 and 96. The axles 94 and 96 are connected with respective normally undriven rear wheels 98 and 100 respectively. During normal vehicle operation, the front wheels 28 and 30 are driven by the engine 12 and the rear wheels roll on the ground due to the movement of the vehicle. However, whenever the clutch pack 60 is engaged, the rear wheels are driven through the differential 20 to improve the tractive effort and performance of the vehicle. It should now be apparent to those skilled in the art that a dynamic all wheel drive system is provided through the use of a single pump and a single clutch.

What is claimed is:

1. An all wheel drive and control mechanism in a vehicle having, a traction control system and a continuous drive mechanism connected with a first pair of normally powered drive wheels comprising;

a second pair of wheels having, a first axle and a second axle; a transfer mechanism including a drive shaft connected with the continuous drive mechanism and a housing rotatable relative to said drive shaft;

a differential gearing mechanism having an input member rotatably connected with said housing and a pair of output members drivingly connected with respective ones of said second pair of wheels;

a fluid reservoir;

a fluid operated selectively engageable clutch mechanism operatively connectable between said drive shaft and said housing;

a pump mechanism having first and second relatively rotatable members with said first member operatively rotatably connected said drive shaft and said second member operatively rotatably connected with said housing; and a solenoid controlled valve mechanism disposed between said pump mechanism controlling a fluid connection between said pump and said fluid reservoir, said solenoid valve having a normally closed position to prevent fluid communication and being controlled to an open position to allow fluid communication between said pump and said reservoir in response to a control signal from the traction control system operatively connecting said pump to deliver pressurized fluid to said clutch mechanism when a speed differential is present between said first and second pump members.

2. An all wheel drive and control apparatus for a vehicle powertrain having a pair of normally driven wheels and a pair of normally undriven wheels comprising:

a drive shaft rotatable with said normally driven wheels;

a housing driven in unison with the normally undriven wheels;

a fluid reservoir;

a selectively engageable fluid operated clutch means disposed between said housing and said drive shaft including a pump having a first portion driven by said housing and a second portion rotating with said drive shaft, said pump being effective to supply fluid pressure to engage said clutch means when a speed differential is present between said drive shaft and said normally undriven wheels and said pump is connected with said reservoir;

and control valve means having a normally closed position and being responsive to a loss of traction at said normally driven wheels to move to an open position and connect said reservoir with said pumps only during said loss of traction.

* * * * *